United States Patent [19]
Tsuchiya et al.

[11] Patent Number: 4,849,486
[45] Date of Patent: Jul. 18, 1989

[54] POLYPHENYLENE ETHER RESIN COMPOSITION

[75] Inventors: Shozo Tsuchiya, Tokyo; Makoto Sasaki, Yokohama; Yukio Kobayashi, Tokyo, all of Japan

[73] Assignee: Nippon Oil Co., Ltd., Japan

[21] Appl. No.: 883,710

[22] Filed: Jul. 9, 1986

[30] Foreign Application Priority Data

Jul. 10, 1985 [JP] Japan ................................ 60-151616
Jul. 10, 1985 [JP] Japan ................................ 60-151617

[51] Int. Cl.$^4$ ........................ C08F 8/48; C08L 71/04
[52] U.S. Cl. ...................................... 525/152; 525/68; 525/133; 525/148; 525/149; 525/151; 525/905
[58] Field of Search ................ 525/152, 905, 151, 148

[56] References Cited

U.S. PATENT DOCUMENTS 3,639,499  2/1972  Snodgrass et al. ................... 525/152
3,658,949  4/1972  Nakashio et al. .................... 525/152
4,613,699  9/1986  Green ................................... 524/129

Primary Examiner—Jacob Ziegler
Attorney, Agent, or Firm—Ostrolenk, Faber, Gerb & Soffen

[57] ABSTRACT

This invention relates to a new and improved resin composition containing polyphenylene ether and, more particularly, to a molding resin composition including polyphenylene ether and cyclopentadiene resin containing a polar group.

The new and improved resin composition has good melting flowability and retains good mechanical and thermal characteristics inherent to polyphenylene ether and can be suitably used as a molding material.

18 Claims, No Drawings

POLYPHENYLENE ETHER RESIN COMPOSITION

BACKGROUND OF THE INVENTION

(1) Field of the Invention

The present invention relates to a new resin composition containing polyphenylene ether and, more particularly, a molding resin composition which contains polyphenylene ether and cyclopentadiene containing a polar group.

A new and improved resin composition of the present invention serves as a material suitable as a molding material while it maintains its original properties, i.e., it has good melting flowability and imparts good mechanical and thermal properties to a molded body.

(2) Description of the Prior Art

Polyphenylene ether is a thermoplastic resin having high heat resistance and good mechanical and electrical characteristics, as disclosed in Japanese Patent Disclosure No. 50-126800 and U.S. Pat. No. 3,306,874. However, if polyphenylene ether is used as a molding material, workability is degraded since its softening point is too high. As a result, the good properties and characteristics of polyphenylene ether could not be utilized.

A resin composition was previously proposed to improve moldability of polyphenylene ether by adding high-impact polystyrene to polyphenylene ether, and has been used in industrial applications (Japanese Patent Publication No. 42-22069 and U.S. Pat. No. 3,383,435). However, melting flowability of this resin composition is not satisfactory.

Another resin composition was proposed to further improve melting flowability by adding a low molecular weight hydrocarbon resin to polyphenylene ether (Japanese Patent Publication No. 57-13584, and Japanese Patent Disclosure Nos. 58-129050, 58-129051, 59-126460, and 47-3136). Examples of the low molecular weight hydrocarbon resin are aromatic petroleum resin derived from petroleum naphtha, cyclopentadiene resin, aromatic-cyclopentadiene copolymeric resin, and cumarone-indene resin derived from coal tar.

By adding such a low molecular weight hydrocarbon resin to polyphenylene ether, the melting flowability of the resultant composition can be improved. However, there is much room left for further improvement. In particular, if a resin composition includes an inorganic filler such as a glass filter, further improvement is required.

SUMMARY OF THE INVENTION

It is an object of the present invention to provide a resin composition wherein melting flowability of the composition can be improved without degrading the mechanical and electrical characteristics and thermal properties of polyphenylene ether.

The present inventors made extensive studies about improvement of polyphenylene ether and found that the heat resistance, the electrical characteristics, and workability as well as melting flowability can be improved by adding cyclopentadiene resin containing a polar group or a phenol hydroxy group to polyphenylene ether. In this case, even if the resin composition included an organic filler, a significant improvement was observed. The present inventors have thus reached the present invention.

According to the present invention, there is provided a molding polyphenylene ether resin composition comprising:

(a) 30 to 100 parts by weight of polyphenylene ether resin;

(b) 0 to 70 parts by weight of styrene resin;

(c) 3 to 100 parts by weight of polar-group containing cyclopentadiene resin with respect to 100 parts by weight of (a)+(b); and (d) 0 to 200 parts by weight of an inorganic filler with respect to 100 parts by weight of (a)+(b)+(c), the polar-group containing cyclopentadiene resin (c) being a resin selected from the group consisting of: a polar-group containing cyclopentadiene resin prepared by copolymerizing 100 parts by weight of component A, i.e., a five-membered ring compound having conjugated double bonds and represented by the following general formula:

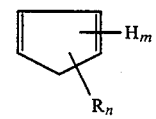

(wherein H is a hydrogen atom, R is an alkyl group having 1 to 3 carbon atoms, each of m and n is independently 0 or an integer of not less than 1, and $m+n=6$) and/or a Diels-Alder adduct, and 1 to 50 parts by weight of component B, i.e., a compound containing carbon-carbon double bonds with a polar group selected from the group consisting of a hydroxy group, a carboxyl group, a carboxylic anhydride group, an ester group, a nitrile group and an amido group; a polar-group containing cyclopentadiene resin prepared by reacting 100 parts by weight of a resin obtained by polymerizing the component A with 1 to 50 parts by weight of the component B; and a phenol hydroxy-group containing cyclopentadiene resin prepared by copolymerizing 100 parts by weight of the component A and 1 to 50 parts by weight of component C, i.e., at least one member selected from monovalent phenol, polyvalent phenol, alkyl-substituted monovalent phenyl, alkyl-substituted polyvalent phenol, and formaldehyde condensates thereof.

DETAILED DESCRIPTION OF THE INVENTION

Polyphenylene ether resin (a) according to the present invention is a monopolymer which has repetition units represented by the following general formulas (I) and (II):

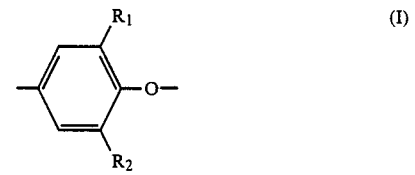

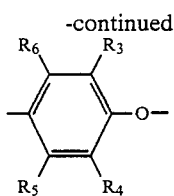

(II)

(wherein each of $R_1$, $R_2$, $R_3$, $R_4$, $R_5$, and $R_6$ is independently an aryl group, a halogen atom, a hydrogen atom or an alkyl group having 1 to 4 carbon atoms and excluding tert-butyl group; and $R_5$ and $R_6$ are not simultaneously hydrogen atoms), and has formula (I), or formulas (I) and (II) as building blocks.

Examples of the polyphenylene ether monomer are homopolymers, e.g., poly(2,6-dimethyl-1,4-phenylene)ether, poly(2-methyl-6-ethyl-1,4-phenylene)ether, poly(2,6-diethyl-1,4-phenylene)ether, poly(2-ethyl-6-n-propyl-1,4-phenylene)ether, poly(2,6-di-n-propyl-1,4-phenylene)ether, poly(2-methyl-6-n-butyl-1,4-phenylene)ether, poly(2-ethyl-6-isopropyl-1,4-phenylene)ether, poly(2-methyl-6-chloro-1,4-phenylene)ether, poly(2-methyl-6-hydroxyethyl-1,4-phenylene)ether, and poly(2-methyl-6-chloroethyl-1,4-phenylene)ether. The polymerization degree suitable for polyphenylene ether resin used in the resin composition of the present invention is given by a number average polymerization degree of 45 to 450. If the number average polymerization degree is less than 45, the mechanical characteristics of the resin composition are degraded. However, if the number average polymerization degree exceeds 450, moldability is degraded.

The polyphenylene ether resin is fabricated by a conventional method, as described in Japanese Patent Publication No. 36-1869.

The styrene resin (b) used in the present invention comprises a polymer derived from at least one structural monomer represented by

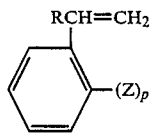

(wherein R is a hydrogen atom, a lower alkyl group, or a halogen atom; Z is selected from a lower alkyl group, a hydrogen atom, and a halogen atom; and p is an integer of 1 to 5). Examples of the polymer for the styrene resin (b) are monopolymers or copolymers of styrene, α-methylstyrene, vinyltoluene, vinyl ethyl benzene, vinylxylene, p-methylstyrene, tert-butylstyrene, and chlorostyrene. If necessary, a copolymer of the structural monopolymer and at least one monomer selected from the group consisting of acrylonitrile, methylmethacrylate, methacrylonitrile, and maleic anhydride can also be used. The content of the structural monomer in the copolymer is not less than 70% by weight, and preferably not less than 90% by weight. Any copolymer having a composition falling outside the above range has poor miscibility with polyphenylene ether and undesirably degrades the mechanical properties of the resin composition.

Examples of the above copolymer are polystyrene, polychlorostyrene, rubber-denatured polystyrene (high-impact polystyrene), a styrene-acrylonitrile copolymer, a styrene-butadiene copolymer, a styrene-butadiene-acrylonitrile copolymer, and styrene-α-methylstyrene copolymer. Among these copolymers, high-impact polystyrene is most preferable. Examples of high-impact polystyrene are polybutadiene, butadiene-styrene copolymer rubber, and rubber-denatured polystyene denatured with an elastomer such as EPDM. Rubber-denatured polystyrene is a two-phase resin wherein the elastic phase is dispersed in the polystyrene resin matrix. Such a resin can be prepared by mechanically mixing an elastomer with polystyrene resin. Alternatively, the two-phase resin can be formed by copolymerizing an elastomer and a styrene-based monomer. The resin prepared by the latter method is more preferable. Industrially, rubber-denatured polystyrene resin is manufactured by graft-polymerizing a styrene-based monomer under the presence of an elastomer.

The polar-group containing cyclopentadiene resin (c) is a resin selected from the group consisting of: a resin prepared by copolymerizing 100 parts by weight of component A, i.e., a five-membered ring compound having conjugated double bonds and represented by the following general formula:

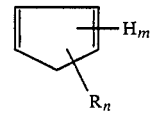

(wherein H is a hydrogen atom, R is an alkyl group having 1 to 3 carbon atoms, each of m and n is independently 0 or an integer of not less than 1, and $m+n=6$) and/or a Diels-Alder adduct, and 1 to 50 parts by weight, preferably 2 to 40 parts by weight, of component B, i.e., a compound containing carbon-carbon double bonds with a polar group selected from the group consisting of a hydroxy group, a carboxyl group, a carboxylic anhydride group, an ester group, a nitrile group and an amido group; a resin prepared by reacting 100 parts by weight of a resin obtained by polymerizing the component A with 1 to 50 parts by weight, preferably 2 to 40 parts by weight, of the component B; and a resin prepared by copolymerizing 100 parts by weight of the component A and 1 to 50 parts by weight, preferably 2 to 40 parts by weight, of component C, i.e., at least one member selected from monovalent phenol, polyvalent phenol, alkyl-substituted monovalent phenyl, alkyl-substituted polyvalent phenol, and formaldehyde condensates thereof.

The components A and B can be copolymerized at a temperature of 150° C. to 300° C. and preferably 200° C. to 280° C. for 10 minutes to 20 hours and preferably one hour to 10 hours. The component A is monopolymerized at a temperature of 150° C. to 300° C. and preferably 200° C. to 280° C. for 10 minutes to 20 hours and preferably one hour to 10 hours. Alternatively, the component A can be monopolymerized using a Friedel-Crafts catalyst such as aluminum trichloride, aluminum tribromide, boron trifluoride, or titanium tetrachloride at a reaction temperature of 0° to 80° C. and preferably 20° to 50° C.

A polymer of the component A can be reacted with the component B at a temperature of 100° to 300° C. and preferably 150° to 250° C. for 10 minutes to 20 hours and preferably one hour to 10 hours. When the components A and B are copolymerized or the component A is monopolymerized, 5 to 100 parts by weight of an aromatic hydrocarbon such as benzene, toluene, or xylene can be used as a solvent with respect to 100 parts by weight of the component A or a mixture of components A and B. After polymerization, the solvent is removed by a conventional method such as distillation. The nonreacted monomer and the low molecular polymer can be eliminated if necessary. In particular, if maleic anhydride is used as the component B, the component A is monopolymerized and then is allowed to react with the component B.

The polymer of the component A can be reacted with the component C at a temperature of 100° to 300° C. and preferably 150° to 250° C. for 10 minutes to 20 hours and preferably one hour to 10 hours.

When the components A and C are copolymerized or the component A is monopolymerized, 5 to 100 parts by weight of an aromatic hydrocarbon such as benzene, toluene, or xylene can be used as a solvent with respect to 100 parts by weight of the component A or a mixture of components A and C. After polymerization, the solvent is removed by a conventional method such as distillation. The nonreacted monomer and the low molecular polymer can be eliminated if necessary. In particular, if a resolve type phenol resin is used, the component A is advantageously monopolymerized and is then reacted with the component C.

Examples of the component A in the industrial applications are: cyclopentadiene and methylcyclopentadiene; Diels-Alder adducts thereof (e.g., dicyclopentadiene, cyclopentadiene-methylcyclopentadiene dimer, and tricyclopentadiene); and mixtures thereof. Among these materials, cyclopentadiene, dicyclopentadiene, or a mixture thereof are most preferable.

High purity cyclopentadiene, dicyclopentadiene, or an alkyl-substituted derivative thereof is preferable but is not required. The content of cyclopentadiene, dicyclopentadiene, or its alkyl-substituted derivative is preferably not less than 80% by weight. Cyclopentadiene and methylcyclopentadiene contained in the $C_5$ fraction of the high-temperature thermal decomposition by-product oil such as naphtha are converted to dimers to obtain mixtures, e.g., dicyclopentadiene, dimethylcyclopentadiene, a cyclopentadiene-methylcyclopentadiene dimer, a cyclopentadiene-isoprene dimer, and a cyclopentadiene-piperylene dimer. Thereafter, the $C_5$ components such as $C_5$ olefin and $C_5$ paraffin can be removed by distillation, and the resultant condensed fraction can be used.

The component B is a compound containing carbon-carbon double bonds, and a polar group selected from the group consisting of a hydroxy group, a carboxyl group, a carboxylic anhydride group, an ester group, a nitrile group, and an amido group. The compound has preferably 3 to 12 carbon atoms.

Examples of the compound having a hydroxy group are monovalent or polyvalent unsaturated alcohols such as allyl alcohol, butenediol, crotyl alcohol, and hexenediol. Examples of the compound having a carboxyl group are unsaturated acids such as acrylic acid, methacrylic acid, crotonic acid, maleic acid, and itaconic acid. Examples of the compound having a carboxylic anhydride group are acid anhydrides such as maleic anhydride and itaconic acid anhydride. Examples of the compound having an ester group are unsaturated esters (e.g., vinyl acetate, vinyl propionate, methyl acrylate, methylprotonate, methyl methacrylate, ethyl acrylate, and butyl acrylate), and natural unsaturated esters (e.g., linseed oil and tung oil). Examples of the compound having a nitrile group are nitriles such as acrylonitrile, methacrylonitrile, and crotononitrile. Examples of the compound having an amido group are acid amides such as acrylic amide and methacrylic amide.

The component C is at least one member selected from the group consisting of monovalent phenol, polyvalent phenol, alkyl-substituted monovalent phenol, alkyl-substituted polyvalent phenol, and formaldehyde condensates thereof. The alkyl-substituted phenol preferably contains 1 to 3 alkyl groups each having 1 to 12 carbon atoms. Examples of the component C are: monovalent phenols such as phenol, cresol, ethylphenol, propylphenol, butylphenol, tert-butylphenol, amyl phenol, hexyl phenol, octylphenol, nonylphenol, and dodecylphenol; polyvalent phenols such as hydroquinone, resorcin, catechol, and bisphenol; monovalent and polyvalent phenols such as novolak type phenol resin and resol type phenol resin; and formaldehyde condensates of alkyl-substituted phenols. Novolak type phenol resins and resol type phenol resins can be prepared by conventional methods. For example, monovalent and polyvalent phenols or alkyl-substituted phenols are mixed with formaldehyde in predetermined ratios. The mixture is subjected to a chemical reaction at a temperature of 40° to 120° C. under the presence of an acid catalyst such as hydrochloric acid to prepare novolak type phenol resin, or under the presence of an alkali catalyst such as caustic soda to prepare resol type phenol resin.

In the fabrication of the cyclopentadiene resin, the unsaturated component in the petroleum fraction, especially, an unsaturated aromatic component can be used in an amount within the same range as or a narrower range than that of the component (a). For example, styrene, $\alpha$-methylstyrene, vinyltoluene, indene, methyl indene and a mixture thereof can be used. On the industrial scale, a byproduct produced in decomposition of naphtha or the like, i.e., so-called $C_9$ fraction is most preferable.

It is also possible to hydrogenate the resin so as to improve its hue and smell.

The cyclopentadiene resin used in the present invention must have a softening point of not less than 100° C., as measured by a ring and ball softening point method (complying with JIS K2531 - 60), preferably 120° C. to 200° C., and more preferably 130° C. to 180° C. If the softening point of the resin is less than 100° C., the thermal deformation temperature of the polyphenyl ether composition greatly decreases. If such a resin is used as a molding material, the properties inherent thereto are greatly degraded.

Examples of the inorganic filler (d) used in the present invention are: a powdery filler such as an oxide (e.g., iron oxide, alumina, magnesium oxide, calcium oxide, and zinc oxide), a hydrated metal oxide (e.g., aluminum hydroxide, magnesium hydroxide, basic magnesium carbonate, calcium hydroxide, tin oxide hydrate, or zirconium oxide hydrate), a carbonate (e.g., calcium carbonate or a magnesium carbonate), a silicate (e.g., talc, clay, bentonite, or attapulgite), a borate (e.g., barium borate or zinc borate), a phosphate (e.g., aluminum phosphate or sodium tripolyphosphate), a sulfate (e.g., gypsum), or a phosphite; a fibrous filler (e.g., glass fiber, potassium titanate fiber, a metal-coated glass fiber, ceramic fiber, wollastonite, carbon fiber, metal carbonate fiber, metal hardened fiber), or a spherical material (e.g., glass bead, glass balloon, or SHIRASU balloon); and others (e.g., glass powder, glass flake, metal flake, and mica). The surface of the organic filler may be treated with a silane-based compound such as vinyltriethoxysilane, 2-aminopropyltriethoxysilane, or 2-glyhydroxypropyltrimethyoxysilane. Among these materials, the fibrous filler such as a glass fiber filler is most preferable. The organic fillers can be used singly or in a combination of more than one.

The resin composition of the present invention essentially consists of (a) 30 to 100 parts by weight and preferably 40 to 80 parts by weight of polyphenylene ether, (b) 0 to 70 parts by weight and preferably 0 to 60 parts by weight of styrene resin, (c) 3 to 100 parts by weight and preferably 5 to 60 parts by weight of the polar-group containing cyclopentadiene resin with respect to 100 parts by weight of (a)+(b), and (d) 0 to 200 parts by weight and preferably 0 to 150 parts by weight of the inorganic filler with respect to 100 parts by weight of (a)+(b)+(c).

The composition of the present invention can be prepared by any conventional method. The components are heated at a dispersion temperature and mixed by an extruder, kneader, a Bumbury's mixer or the like.

The resin composition of the present invention has good melting flowability, compared with the commercially available polyphenylene ether resin as a mixture of polyphenylene ether and high-impact polystyrene. Therefore, moldability is improved, and good thermal, mechanical, and electrical characteristics inherent to polyphenylene ether can be preserved.

The polyphenylene ether resin composition of the present invention can be molded into various molded products by injection molding, sheet extrusion, vacuum molding, contour extrusion, foaming, or the like.

A conventional antioxidant, ultraviolet absorption agent, lubricant, fire retardant, antistatic agent, foaming agent or the like can be used in the polyphenylene ether resin.

The following examples are intended to illustrate the compositions and methods of this invention in somewhat greater detail but it is to be understood that the particular ingredients, the proportions of ingredients, and the conditions of the operation do not define the limits of this invention which have been set forth above. Percent concentration throughout this specification and claims refers to percent weight, unless otherwise indicated.

PREPARATION EXAMPLE 1

Five hundred and sixty grams of dicyclopentadiene having 96% purity, 140 g of vinyl acetate, and 300 g of mixed xylene were stirred in an autoclave, and heated and reacted at a temperature of 260° C. for four fours. When the chemical reaction was completed, the autoclave was cooled. The cooled contents were distilled to remove nonreacted monomers, low molecular polymers, and xylene, and 595 g of resin I was obtained as a residue. Resin I had a softening point of 145.0° C. and was found to contain a large number of ester groups according to its infrared spectrum.

PREPARATION EXAMPLE 2

Following the same procedures as in Preparation Example 1, 525 g of dicyclopentadiene having 96% purity, 175 g of methylmethacrylate (MMA), and 300 g of mixed xylene were mixed in an autoclave, and heated and reacted at a temperature of 260° C. for three hours to prepare 567 g of resin II. Resin II had a softening point of 138.0° C. and was found to have ester bonds according to an IR spectrum.

PREPARATION EXAMPLE 3

Following the same procedures as in Preparation Example 1, 490 g of dicyclopentadiene, 210 g of allyl alcohol, and 300 g of mixed xylene were mixed in an autoclave, and heated and reacted at a temperature of 270° C. for four fours to prepare 560 g of resin III. Resin III had a softening point of 132.0° C. and a hydroxyl value of 210 mgKOH/g.

PREPARATION EXAMPLE 4

Following the same procedures as in Preparation Example 1, 700 g of dicyclopentadiene and 300 g of mixed xylene were mixed in an autoclave, and heated and reacted at a temperature of 260° C. for two hours to prepare 546 g of resin having a melting point of 140.5° C. This resin was heated and melted at a temperature of 200° C., and 54.0 g of maleic anhydride was added to the resin melt. The resin melt was reacted with maleic anhydride at a temperature of 200° C. for two hours to prepare resin IV having a softening point of 181.0° C. and an acid value of 56.0 mgKOH/g.

PREPARATION EXAMPLE 5

Following the same procedures as in Preparation Example 1, 665 g of dicyclopentadiene, 35 g of maleic anhydride, and 300 g of mixed xylene were mixed in an autoclave, and heated and reacted at a temperature of 260° C. for three hours to prepare 553 g of resin V having a softening point of 140.0° C. and an acid value of 27.5 mgKOH/g.

PREPARATION EXAMPLE 6

Following the same procedures as in Preparation Example 1, 560 g of dicyclopentadiene, 140 g of acrylic acid, and 300 g of mixed xylene were mixed in an autoclave, and heated and reacted at a temperature of 260° C. for four hours to prepare 578 g of resin VI having a softening point of 135.0° C. and an acid value of 15.4 mgKOH/g.

PREPARATION EXAMPLE 7

Following the same procedures as in Preparation Example 1, 560 g of dicyclopentadiene, 140 g of acrylonitrile, and 300 g of mixed xylene were mixed in an autoclave, and heated and reacted at a temperature of 260° C. for three hours to prepare 525 g of resin VII. Resin VII had a softening point of 130.5° C. and its IR spectrum exhibited nitrile group absorption.

The resins prepared in Preparation Examples 1 to 7 and the Control resin were used to prepare polyphenylene ether resin compositions below, and the properties of the samples were tested. The results are summarized in Table 1.

(Preparation of Compositions)

The components of each composition were mixed by a Henschel mixer and extruded by a two-shaft extruder to prepare melted pellets. The pellets were molded by an injection molding machine at a cylinder temperature of 250° to 300° C. to prepare test samples.

| (Property Test) | |
| --- | --- |
| i Melt Index: | measured at a temperature of 260° C. at 10 kg. |
| ii Tensile Strength and Elongation: | tested using |

| (Property Test) | | | (Property Test) | |
|---|---|---|---|---|
| iii | Notched Izod Impact Strength: | No. 5 dumbbell, complying with ASTM-D-638. using ⅛ × ½ × 5/2 inch test samples, complying with ASTM-D-256. | iv Thermal Deformation Temperature: | performed at a pressure of 18.6 kg/cm$^2$, complying with ASTM-D-648. |

TABLE 1

| Component and Property | Example 1 | Example 2 | Example 3 | Example 4 | Example 5 | Example 6 | Example 7 | Comparative Example 1 | Comparative Example 2 |
|---|---|---|---|---|---|---|---|---|---|
| Polyphenylene Ether (1) (wt %) | 73.6 | 73.6 | 73.6 | 73.6 | 73.6 | 73.6 | 73.6 | 73.6 | 80 |
| Styrene Resin (2) (wt %) | 18.4 | 18.4 | 18.4 | 18.4 | 18.4 | 18.4 | 18.4 | 18.4 | 20 |
| Inorganic Filler (wt %) (3) | — | — | — | — | — | — | — | — | — |
| Resin (I) (wt %) | 8 | — | — | — | — | — | — | — | — |
| Resin (II) (wt %) | — | 8 | — | — | — | — | — | — | — |
| Resin (III) (wt %) | — | — | 8 | — | — | — | — | — | — |
| Resin (IV) (wt %) | — | — | — | 8 | — | — | — | — | — |
| Resin (V) (wt %) | — | — | — | — | 8 | — | — | — | — |
| Resin (VI) (wt %) | — | — | — | — | — | 8 | — | — | — |
| Resin (VII) (wt %) | — | — | — | — | — | — | 8 | — | — |
| Control Resin (4) (wt %) | — | — | — | — | — | — | — | 8 | — |
| Melt Index (g/10 min) | 22.75 | 23.05 | 22.70 | 21.95 | 22.10 | 22.10 | 22.05 | 16.85 | 12.95 |
| Tensile Strength (kg/cm$^2$) | 640 | 640 | 630 | 630 | 620 | 640 | 620 | 615 | 620 |
| Elongation at Break (%) | 65.0 | 62.3 | 64.5 | 66.0 | 68.5 | 68.0 | 65.5 | 59.3 | 62.0 |
| Izod Impact Strength (kg · cm/cm) | 17.2 | 17.5 | 16.5 | 15.5 | 17.0 | 16.8 | 16.3 | 15.6 | 18.0 |
| Thermal Deformation (°C.) | 119.0 | 118.5 | 116.0 | 117.0 | 118.0 | 116.0 | 116.5 | 117.5 | 121.0 |

| Component and Property | Example 8 | Example 9 | Example 10 | Example 11 | Example 12 | Example 13 | Example 14 | Comparative Example 3 | Comparative Example 4 |
|---|---|---|---|---|---|---|---|---|---|
| Polyphenylene Ether (1) (wt %) | 41.65 | 41.65 | 41.65 | 41.65 | 41.65 | 41.65 | 41.65 | 41.65 | 49 |
| Styrene Resin (2) (wt %) | 17.85 | 17.85 | 17.85 | 17.85 | 17.85 | 17.85 | 17.85 | 17.85 | 21 |
| Inorganic Filler (wt %) (3) | 25.5 | 25.5 | 25.5 | 25.5 | 25.5 | 25.5 | 25.5 | 25.5 | 30 |
| Resin (I) (wt %) | 15 | — | — | — | — | — | — | — | — |
| Resin (II) (wt %) | — | 15 | — | — | — | — | — | — | — |
| Resin (III) (wt %) | — | — | 15 | — | — | — | — | — | — |
| Resin (IV) (wt %) | — | — | — | 15 | — | — | — | — | — |
| Resin (V) (wt %) | — | — | — | — | 15 | — | — | — | — |
| Resin (VI) (wt %) | — | — | — | — | — | 15 | — | — | — |
| Resin (VII) (wt %) | — | — | — | — | — | — | 15 | — | — |
| Control Resin (4) (wt %) | — | — | — | — | — | — | — | 15 | — |
| Melt Index (g/10 min) | 19.25 | 18.90 | 18.75 | 18.40 | 18.50 | 18.35 | 18.45 | 10.05 | 4.20 |

| Component and Property | Example 1 | Example 2 | Example 3 | Example 4 | Example 5 | Example 6 | Example 7 | Comparative Example 3 | Comparative Example 4 |
|---|---|---|---|---|---|---|---|---|---|
| Tensile Strength (kg/cm$^2$) | 1105 | 1090 | 1075 | 1040 | 1055 | 1030 | 1060 | 1040 | 1035 |
| Elongation at Break (%) | 11.8 | 12.4 | 11.9 | 11.9 | 12.2 | 12.3 | 11.8 | 11.8 | 12.3 |
| Izod Impact Strength (kg · cm/cm) | 8.8 | 9.2 | 9.0 | 8.8 | 8.9 | 9.1 | 9.1 | 9.0 | 9.6 |
| Thermal Deforma- | 128.5 | 126.5 | 126.0 | 129.0 | 127.0 | 128.5 | 128.0 | 130.0 | 138.5 |

TABLE 1-continued tion (°C.)

Notes
(1) Polyphenylene ether: poly(2,6-dimethyl-1,4-phenylene) ether having a specific viscosity of 0.50 dl/g measured in chloroform at 25° C.
(2) Styrene resin: high-impact strength polystyrene "Diarex HT" (trade name) available from Mitsubishi Monstant Kasei Kogyo K. K.
(3) Inorganic filler: chopped glass "OS-4715" available from NITTO BOSEKI CO., LTD.
(4) Control resin: aromatic hydrocarbon resin "Petrodin 150" available from Mitsui Petrochemical Industries, LTD.

Melting flowability of the compositions in Examples 1 to 14 were greatly improved.

PREPARATION EXAMPLE 8

Four hundred and ninety grams of dicyclopentadiene having 96% purity, 210 g of phenol, and 300 g of mixed xylene were stirred in an autoclave, and heated and reacted at a temperature of 260° C. for six hours. After the reaction was completed, the autoclave was cooled. The contents were distilled to eliminate nonreacted monomers, low molecular polymers, and xylene. The residue was 525 g of resin VIII. Resin VIII had a softening point of 131.0° C., and a hydroxyl value of 205 mgKOH/g.

PREPARATION EXAMPLE 9

Following the same procedures as in Preparation Example 8, 450 g of dicyclopentadiene having 96% purity, 250 g of bisphenol A, and 300 g of mixed xylene were mixed in an autoclave, and heated and reacted at a temperature of 260° C. for five hours to prepare 580 g of resin IX. Resin IX had a softening point of 140.0° C. and a hydroxyl value of 232 mgKOH/g.

PREPARATION EXAMPLE 10

Following the same procedures as in Preparation Example 8, 500 g of dicyclopentadiene having 96% purity, 300 g of resol type phenol resin derived from p-tert-butylphenol and formaldehyde, and 300 g of mixed xylene were mixed in an autoclave, and heated and reacted at a temperature of, 260° C. for five hours to prepare resin X. Resin X had a softening point of 136.0° C. and a hydroxyl value of 198 mgKOH/g.

Following the same procedures as described with reference to Preparation Examples 1 to 7, the resins prepared in Preparation Examples 8 to 10 and the control resin were used to prepare polyphenylene ether resin compositions. The properties of these resins were tested. The results are summarized in Table 2.

TABLE 2

| Component and Property | Example 15 | Example 16 | Example 17 | Comparative Example 5 | Comparative Example 6 |
|---|---|---|---|---|---|
| Polyphenylene Ether (1) (wt %) | 73.6 | 73.6 | 73.6 | 73.6 | 80 |
| Styrene Resin (2) (wt %) | 18.4 | 18.4 | 18.4 | 18.4 | 20 |
| Inorganic Filler (3) (wt %) | — | — | — | — | — |
| Resin (VIII) (wt %) | 8 | — | — | — | — |
| Resin (IX) (wt %) | — | 8 | — | — | — |
| Resin (X) (wt %) | — | — | 8 | — | — |
| Control Resin (4) (wt %) | — | — | — | 8 | — |
| Melt Index (g/10 min) | 22.25 | 21.75 | 20.90 | 16.85 | 12.95 |
| Tensile Strength (kg/cm$^2$) | 625 | 635 | 635 | 615 | 620 |
| Elongation at Break (%) | 68.0 | 66.5 | 67.0 | 59.3 | 62.0 |
| Izod Impact Strength (kg · cm/cm) | 17.3 | 16.8 | 16.9 | 15.6 | 18.0 |
| Thermal Deformation (°C.) | 117.0 | 118.0 | 118.5 | 117.5 | 121.0 |

| Component and Property | Example 18 | Example 19 | Example 20 | Comparative Example 7 | Comparative Example 8 |
|---|---|---|---|---|---|
| Polypheylene Ether (1) (wt %) | 41.65 | 41.65 | 41.65 | 41.65 | 49 |
| Styrene Resin (2) (wt %) | 17.85 | 17.85 | 17.85 | 17.85 | 2.1 |
| Inorganic Filler (3) (wt %) | 25.5 | 25.5 | 25.5 | 25.5 | 30 |
| Resin (VIII) (wt %) | 15 | — | — | — | — |
| Resin (IX) (wt %) | — | 15 | — | — | — |
| Resin (X) (wt %) | — | — | 15 | — | — |
| Control Resin (4) (wt %) | — | — | — | 15 | — |
| Melt Index (g/10 min) | 18.70 | 18.30 | 18.35 | 10.05 | 4.20 |
| Tensile Strength (kg/cm$^2$) | 1070 | 1075 | 1055 | 1040 | 1035 |
| Elongation at Break (%) | 11.7 | 11.9 | 12.0 | 11.8 | 12.3 |
| Izod Impact Strength (kg · cm/cm) | 8.9 | 9.2 | 9.1 | 9.0 | 9.6 |
| Thermal Deformation (°C.) | 126.0 | 128.5 | 129.5 | 130.0 | 138.0 |

As is apparent from Table 2, melting flowability of the compositions in Examples 15 to 20 was greatly improved.

What is claimed is:

1. A molding polyphenylene ether resin composition comprising:
   (a) 30 to 100 parts by weight of polyphenylene ether resin;

(b) 0 to 70 parts by weight of styrene resin;
(c) 3 to 100 parts by weight of polar-group containing cyclopentadiene resin having a ring and a ball softening point of not less than 100° C. with respect to 100 parts by weight of (a)+ (b);
the polar-group cyclopentadiene resin (c) being a resin selected from the group consisting of: a polargroup cyclopentadiene resin prepared by copolymerizing 100 parts by weight of component A consisting essentially of a five-membered ring compound having conjugated double bonds and represented by the formula:

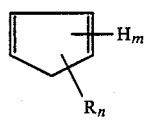

(wherein H is a hydrogen atom, R is an alkyl group having 1 to 3 carbon atoms, each of m and n is independently 0 or an integer of not less than 1, and $m+n=6$) a Diels-Alder adduct thereof or mixture thereof and 1 to 50 parts by weight of component B, which is a compound containing carbon-carbon double bonds with a polar group selected from the group consisting of a hydroxy group and an ester group.

2. A molding polyphenylene ether resin composition according to claim 1 comprising 40–80 parts of polyphenylene ether resin, 0–60 parts of styrene resin, 5–60 parts of the polargroup cyclopentadiene resin with respect to 100 parts by weight of the combination of polyphenylene ether resin and styrene resin.

3. A molding polyphenylene ether resin composition according to claim 1 in which the styrene resin contains at least 70° by weight copolymerized monomer of the formula

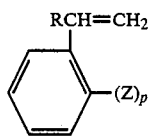

in which R is hydrogen, lower alkyl or halogen, Z is lower alkyl, hydrogen or halogen and p is an integer of 1 to 5.

4. A molding polyphenylene ether resin composition according to claim 3 in which the copolymerized monomer is not less than 90° by weight.

5. A molding polyphenylene ether resin composition according to claim 1 in which the styrene resin is polystyrene.

6. A molding polyphenylene ether resin composition according to claim 1 in which the amount of component B is 2 to 40 parts by weight.

7. A molding polyphenylene ether resin composition according to claim 1 in which the polar-group cyclopentadiene resin has a ring and ball softening point of 120° to 200° C.

8. A molding polyphenylene ether resin composition according to claim 1 in which the polar-group cyclopentadiene resin has a ring and ball softening point of 130° to 180° C.

9. A molding polyphenylene ether resin composition according to claim 1 in which component A is dicyclopentadiene and component B is methyl methacrylate.

10. A molding polyphenylene ether resin composition according to claim 9 in which the styrene resin is polystyrene, the polar-group cyclopentadiene resin has a ring and ball softening point of 120° to 200° C. and the amount of component B is 2 to 40 parts by weight.

11. A molding polyphenylene ether resin composition according to claim 1 in which the polyphenylene ether resin is poly(dimethylphenylene) ether.

12. The molding polyphenylene ether resin composition according to claim 1, wherein said component B is an unsaturated alcohol.

13. The molding polyphenylene ether resin composition according to claim 12, wherein said unsaturated alcohol is selected from the group consisting of allyl alcohol, butenediol, crotyl alcohol and hexenediol.

14. The molding polyphenylene ether resin composition according to claim 1, wherein said component B is an unsaturated ester.

15. The molding polyphenylene ether resin composition according to claim 14 wherein said unsaturated ester is selected from the group consisting of vinyl acetate, vinyl propionate, methyl methacrylate, ethyl acrylate and butyl acrylate.

16. A molding polyphenylene ether resin composition according to claim 1, in which said component A is dicyclopentadiene.

17. A molding polyphenylene ether resin composition according to claim 1, in which said component B is methyl methacrylate.

18. A molding polyphenylene ether resin composition consisting essentially of;
(a) 40–80 parts of poly(dimethylphenylene) ether;
(b) 0–60 parts of polystyrene; and
(c) 5–60 parts the resin copolymerization product of dicyclopentadiene and methyl methacrylate having a ring and ball softening point of 130°–180° C.

* * * * *